(12) United States Patent
Taniguchi et al.

(10) Patent No.: US 11,889,277 B2
(45) Date of Patent: Jan. 30, 2024

(54) SOUND SIGNAL PROCESSING DEVICE AND SOUND SIGNAL PROCESSING METHOD

(71) Applicant: DENSO TEN Limited, Kobe (JP)

(72) Inventors: Yuuji Taniguchi, Kobe (JP); Yuichi Kusakabe, Kobe (JP); Yuuki Yamano, Kobe (JP)

(73) Assignee: DENSO TEN Limited, Kobe (JP)

( * ) Notice: Subject to any disclaimer, the term of this patent is extended or adjusted under 35 U.S.C. 154(b) by 159 days.

(21) Appl. No.: 17/440,330

(22) PCT Filed: Oct. 12, 2020

(86) PCT No.: PCT/JP2020/038530
§ 371 (c)(1),
(2) Date: Sep. 17, 2021

(87) PCT Pub. No.: WO2022/079776
PCT Pub. Date: Apr. 21, 2022

(65) Prior Publication Data
US 2022/0360893 A1    Nov. 10, 2022

(51) Int. Cl.
*H04R 3/00*    (2006.01)
(52) U.S. Cl.
CPC ...................... *H04R 3/00* (2013.01)
(58) Field of Classification Search
CPC ....................................................... H04R 3/00
USPC ............................................. 381/77, 80, 111
See application file for complete search history.

(56) References Cited

U.S. PATENT DOCUMENTS

| | | | | |
|---|---|---|---|---|
| 8,843,651 | B2* | 9/2014 | Sugumar | H04L 47/10 709/232 |
| 8,949,115 | B2* | 2/2015 | Shibuya | H04R 3/00 704/211 |
| 10,812,928 | B1* | 10/2020 | Salem | H04R 5/02 |
| 11,477,156 | B2* | 10/2022 | Lord | G06T 1/0021 |

FOREIGN PATENT DOCUMENTS

| | | |
|---|---|---|
| JP | 2001-175591 A | 6/2001 |
| JP | 2012-108254 A | 6/2012 |

\* cited by examiner

*Primary Examiner* — Disler Paul
(74) *Attorney, Agent, or Firm* — Oliff PLC

(57) ABSTRACT

A sound signal processing device includes a plurality of sound signal processing units and a plurality of buffers. Each of the plurality of sound signal processing units belongs to one of a plurality of groups and executes a predetermined process by using a supplied sound signal. The plurality of buffers are provided with mutually different buffer sizes where each of the plurality of buffers is associated with one of the groups and supplies an accumulated sound signal to a sound signal processing unit that belongs to an associated group.

5 Claims, 3 Drawing Sheets

SOUND SIGNAL PROCESSING DEVICE AND SOUND SIGNAL PROCESSING METHOD

CROSS-REFERENCE TO RELATED APPLICATION

This application is a national stage application of International Application No. PCT/JP2020/038530, filed on Oct. 12, 2020, which designates the United States, the entire contents of which are herein incorporated by reference.

FIELD

The present invention relates to a sound signal processing device and a sound signal processing method.

BACKGROUND

In recent years, for a sound processing solution (ECNC: Echo Canceller/Noise Canceller, ICC: In-Car Communication, or the like), a Hard DSP is replaced with a Soft ip from a viewpoint of cost reduction.

In a case where a Soft ip is used, a buffer is needed in front and back of each processing unit that executes a function regarding sound signal processing. On the other hand, a period of time when a sound signal passes through a buffer leads to performance degradation of each function.

Furthermore, a technique to divide one RAM (Random Access Memory) into a plurality of areas as needed when a plurality of data are buffered, so as to attain improvement of efficiency of a whole circuit, has been known conventionally (see, for example, Patent Literature 1).

CITATION LIST

Patent Literature

Patent Literature 1: Japanese Patent Application Publication No. 2001-175591

SUMMARY

Technical Problem

However, in a conventional technique, it may be impossible to improve processing efficiency of a device that includes a plurality of processing units that execute a function regarding sound signal processing.

The present invention is provided by taking the above into consideration and aims to improve processing efficiency of a device that includes a plurality of processing units that execute a function regarding sound signal processing.

Solution to Problem

In order to solve a problem(s) as described above and achieve an object, a sound signal processing device according to the present invention has a plurality of sound signal processing units and a plurality of buffers. Each of the plurality of sound signal processing units belongs to one of a plurality of groups and executes a predetermined process by using a supplied sound signal. The plurality of buffers are provided with mutually different buffer sizes where each of the plurality of buffers is associated with one of the groups and supplies an accumulated sound signal to a sound signal processing unit that belongs to an associated group.

Advantageous Effects of Invention

According to the present invention, it is possible to improve processing efficiency of a device that includes a plurality of processing units that execute a function regarding sound signal processing.

DESCRIPTION OF EMBODIMENTS

Hereinafter, an embodiment(s) of a sound signal processing device and a sound signal processing method as disclosed in the present application will be explained in detail with reference to the accompanying drawing(s). Additionally, the present invention is not limited by an embodiment (s) as illustrated below.

Figure 1:
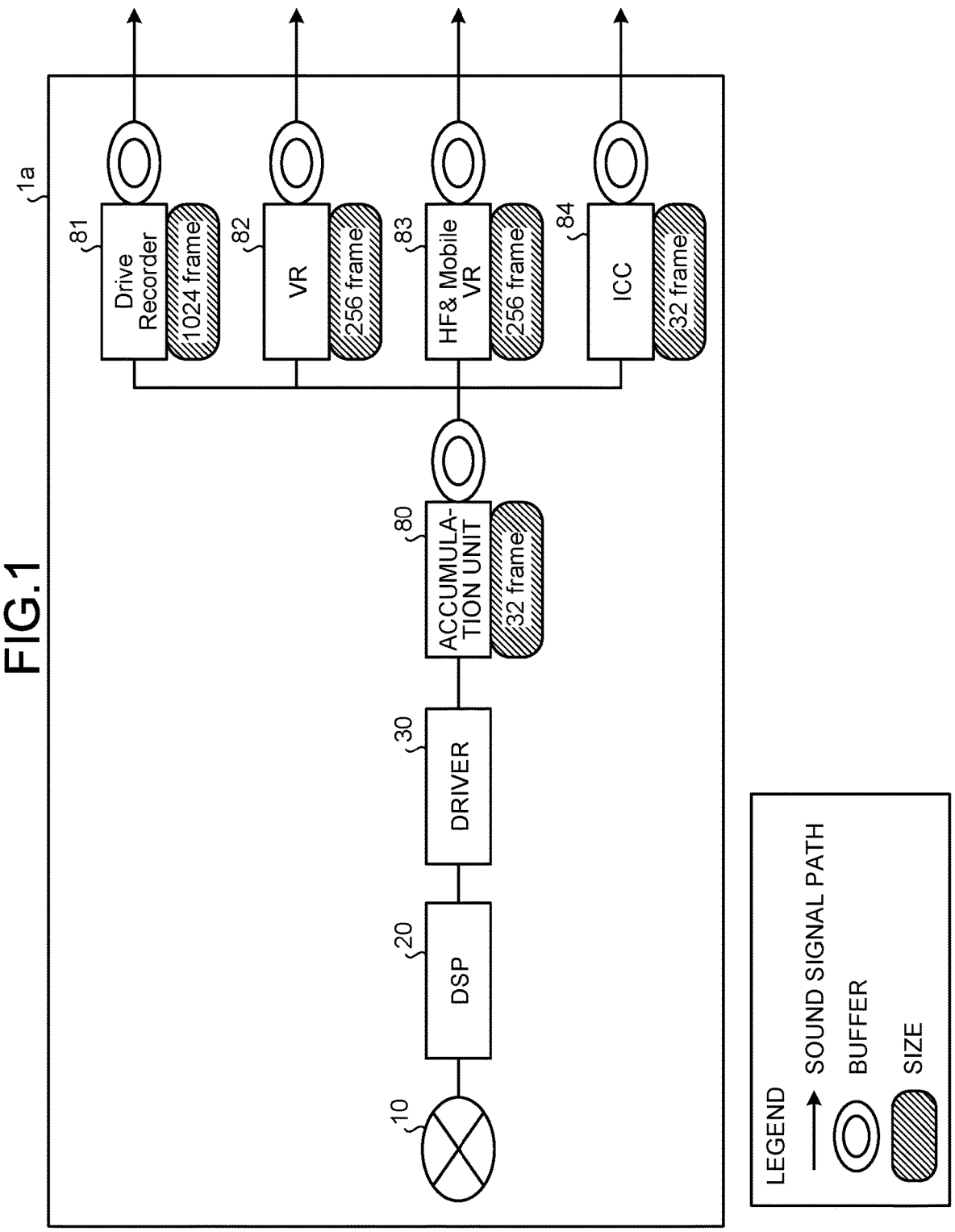
FIG. 1 is a diagram that illustrates a configuration of a conventional sound signal processing device.

First, a configuration of a conventional sound signal processing device will be explained by using FIG. 1. FIG. 1 is a diagram that illustrates a configuration of a conventional sound signal processing device.

As illustrated in FIG. 1, a sound signal processing device 1a has a plurality of sound signal processing units (signs 81, 82, 83, 84) and one buffer (an accumulation unit 80) that is provided in front of the plurality of sound signal processing units. Moreover, a buffer is provided in back of each sound signal processing unit.

In an example of FIG. 1, a frequency of a process that supplies a sound signal that is accumulated in a buffer to each processing unit is increased, so that a load on a CPU (Central Processing Unit) is increased. One of objects of an embodiment is to inhibit such an increase in a load on a CPU.

Figure 2:
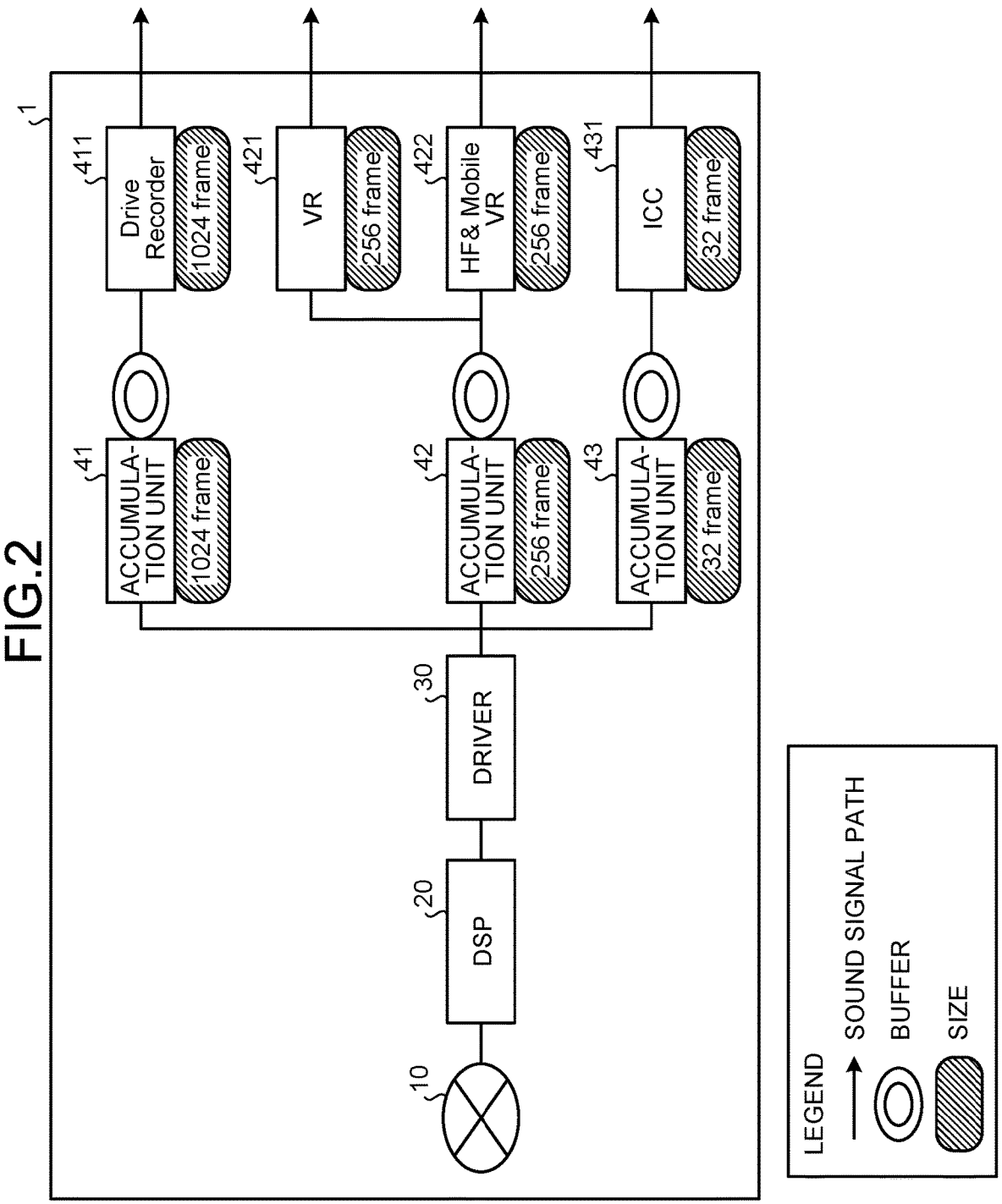
FIG. 2 is a diagram that illustrates a configuration example of a sound signal processing device according to an embodiment.

FIG. 2 is a diagram that illustrates a configuration example of a sound signal processing device according to an embodiment. For example, a sound signal processing device 1 is a multifunctional car audio that has a plurality of functions.

As illustrated in FIG. 2, the sound signal processing device 1 has a microphone 10, a DSP 20 (an Audio DSP), and a driver 30 (a Sound Driver).

The DSP 20 executes amplification and tuning of a sound. Furthermore, the driver 30 executes conversion of a sampling rate.

Furthermore, the sound signal processing device 1 has an accumulation unit 41, an accumulation unit 42, and an accumulation unit 43. Each accumulation unit functions as a buffer that temporarily accumulates a sound signal.

A buffer size of the accumulation unit 41 is 1024 frames. Furthermore, a buffer size of the accumulation unit 42 is 256 frames. Furthermore, a buffer size of the accumulation unit 43 is 32 frames. Herein, an amount of a sound signal is thus represented by a number of a frame(s).

Moreover, the sound signal processing device 1 has a sound signal processing unit 411, a sound signal processing unit 421, a sound signal processing unit 422, and a sound signal processing unit 431.

In an example of FIG. 2, the sound signal processing unit 411 functions as a Drive Recorder, and needs a sound signal with 1024 frames in order to execute a process thereof.

Furthermore, the sound signal processing unit 421 functions as VR (Voice Recognition), and needs a sound signal with 256 frames in order to execute a process thereof.

Furthermore, the sound signal processing unit 422 functions as HF (Hands Free) & Mobile VR, and needs a sound signal with 256 frames in order to execute a process thereof.

Furthermore, the sound signal processing unit 431 functions as ICC, and needs a sound signal with 32 frames in order to execute a process thereof.

Moreover, each sound signal processing unit transfers a sound signal or the like that is obtained as a result of executing of a process thereof to a latter function. Furthermore, each of respective sound signal processing units has an independent CPU.

Sound signal processing units are classified into groups according to a size of a sound signal that is needed for a process thereof. Furthermore, each group is associated with an accumulation unit with a buffer size that is identical to a size of a sound signal that is needed for a process thereof.

For example, the sound signal processing unit 411 belongs to a first group that needs a sound signal with 1024 frames for a process thereof and the accumulation unit 41 is associated therewith.

Furthermore, for example, the sound signal processing unit 421 and the sound signal processing unit 422 belong to a second group that need a sound signal with 256 frames for processes thereof and the accumulation unit 42 is associated therewith.

Furthermore, for example, the sound signal processing unit 431 belongs to a third group that needs a sound signal with 32 frames for a process thereof and the accumulation unit 43 is associated therewith.

Thus, each sound signal processing unit belongs to one of groups that are divided according to a size of a sound signal that is needed for a process thereof. Furthermore, each accumulation unit is provided with a buffer size that is identical to a size of a sound signal that is needed for a process of a sound signal processing unit that belongs to an associated group.

Thereby, it is possible to decrease a period of time when a sound signal passes through a buffer and further reduce a processing load on a CPU.

Thus, the sound signal processing device 1 has a plurality of sound signal processing units where each thereof belongs to one of a plurality of groups, and a plurality of accumulation units (buffers) that are provided with mutually different buffer sizes where each thereof is associated with one of the groups.

In a sound signal processing method according to an embodiment, a plurality of accumulation units (buffers) supply an accumulated sound signal to a sound signal processing unit that belongs to an associated group.

Furthermore, in a sound signal processing method according to an embodiment, a plurality of sound signal processing units execute a predetermined process by using a supplied sound signal.

Thus, a buffer with a buffer size that matches a group of a sound signal processing unit(s) supplies a sound signal thereto, so that it is possible to improve processing efficiency of a device that includes a plurality of processing units that execute a function regarding sound signal processing, according to an embodiment.

Figure 3:
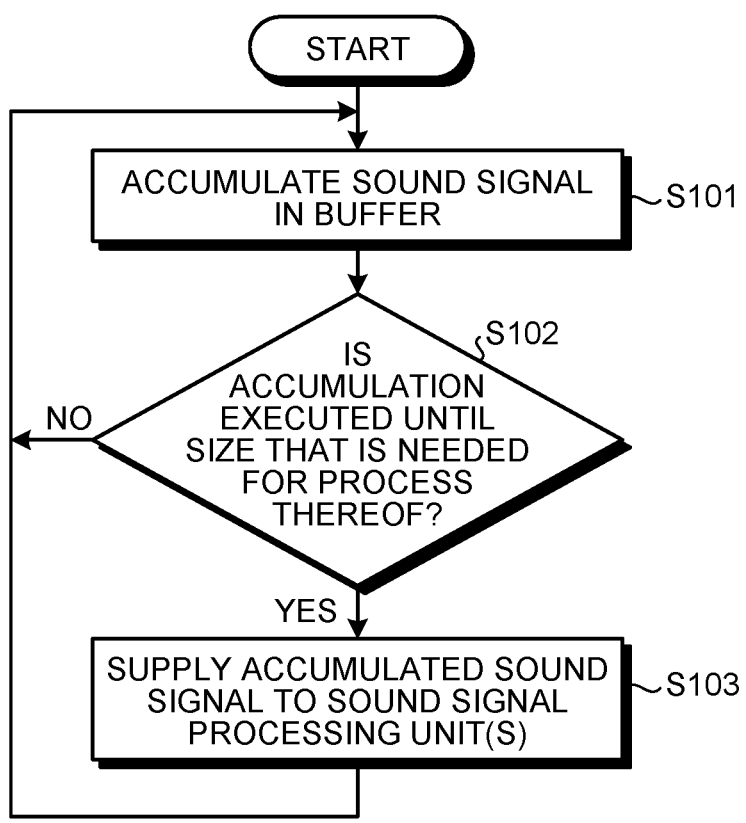
FIG. 3 is a flowchart that illustrates a procedure of a process that is executed by a sound signal processing device according to an embodiment.

FIG. 3 is a flowchart that illustrates a procedure of a process that is executed by a sound signal processing device according to an embodiment. As illustrated in FIG. 3, first, the sound signal processing device 1 accumulates a sound signal that is input from the microphone 10 in a buffer (an accumulation unit) (step S101).

In an example of FIG. 2, a sound signal is simultaneously accumulated in the accumulation unit 41, the accumulation unit 42, and the accumulation unit 43.

Herein, the sound signal processing device 1 continues to accumulate a sound signal in each buffer (step S101) as long as a sound signal with a size that is needed for a process thereof is not accumulated (step S102: No).

Each accumulation unit is associated with a sound signal processing unit that is needed for a process of a sound signal with a size that is equivalent to its own buffer size. Hence, a size that is needed for a process of a sound signal is equal to a buffer size of each associated accumulation unit.

For example, for the accumulation unit 41, as a sound signal with 1024 frames is accumulated, Yes is determined at step S102.

Furthermore, for example, for the accumulation unit 42, as a sound signal with 256 frames is accumulated, Yes is determined at step S102.

Furthermore, for example, for the accumulation unit 43, as a sound signal with 32 frames is accumulated, Yes is determined at step S102.

As a sound signal with a size that is needed for a process thereof is accumulated in each buffer (step S102: Yes), the sound signal processing device 1 supplies an accumulated sound signal to a sound signal processing unit(s) (step S103).

As has been described above, the sound signal processing device 1 according to an embodiment has a plurality of sound signal processing units and a plurality of buffers (accumulation units). Each of the plurality of sound signal processing units belongs to one of a plurality of groups and executes a predetermined process by using a supplied sound signal. The plurality of buffers are provided with mutually different buffer sizes where each of the plurality of buffers is associated with one of the groups and supplies an accumulated sound signal to a sound signal processing unit that belongs to an associated group. Thus, a buffer that matches a size of a sound signal that is needed for a process thereof is prepared, so that it is possible to reduce a period of time when each sound signal processing unit awaits accumulation of a sound signal. Hence, according to the present embodiment, it is possible to improve processing efficiency of a device that includes a plurality of processing units that execute a function regarding sound signal processing.

Herein, as a period of time when a sound signal passes through each processing unit is increased in a multifunctional car audio, no authentication requirement for each function may be fulfilled so as to decease or lose a value of a product.

As the sound signal processing device 1 according to the present embodiment is applied to a multifunctional audio, it is possible to inhibit a decrease and a loss of a value of a product.

It is also possible to consider that the sound signal processing device 1 according to the present embodiment is provided by executing component optimization such as reduction of an extra buffer and/or arrangement of a buffer with an optimum buffer size for the conventional sound signal processing device 1a as illustrated in FIG. 1.

Hence, a specific effect of the sound signal processing device 1 according to the present embodiment will be explained by comparing it with the conventional sound signal processing device 1a.

Furthermore, as an example, a period of time of 1.33 ms and a CPU utilization of 1% are herein needed for accumulating a sound signal with 32 frames in a buffer.

As illustrated in FIG. 1, in the conventional sound signal processing device 1a, each sound signal processing unit 5 includes a buffer with a buffer size that is identical to a size of a sound signal that is needed for a process thereof, separately from an accumulation unit 80 with a buffer size of 32 frames.

The sound signal processing unit 81 that functions as a Drive Recorder includes a buffer with a buffer size of 1024 frames.

Whereas the sound signal processing unit 81 accumulates a sound signal in a buffer with a buffer size of 1024 frames, a sound signal with 1024 frames is supplied from the accumulation unit 41 to the sound signal processing unit 411 in an embodiment.

Hence, (1024 frames/32 frames)×1%=32%, so that it is possible to consider that a processing load on a CPU that executes a Drive Recorder is reduced by 32% according to the present embodiment.

Furthermore, each of the sound signal processing unit 82 that functions as VR and the sound signal processing unit 83 that functions as HF & Mobile VR includes a buffer with a buffer size of 256 frames.

Whereas each of the sound signal processing unit 82 and the sound signal processing unit 83 accumulates a sound signal in a buffer with a buffer size of 256 frames, the sound signal processing unit 421 and the sound signal processing unit 422 in an embodiment are supplied with a sound signal with 256 frames from the accumulation unit 42.

Hence, (256 frames/32 frames)×1%=8%, so that it is possible to consider that a processing load on a CPU that executes VR or HF & Mobile VR is reduced by 8% according to the present embodiment.

Moreover, (256 frames/32 frames)×1.33 ms=10.64 ms, so that it is possible to consider that a delay time at a time when VR or HF & Mobile VR is executed is reduced by 10.64 ms according to the present embodiment.

Furthermore, the sound signal processing unit 84 that functions as ICC includes a buffer with a buffer size of 32 frames.

Whereas the sound signal processing unit 84 accumulates a sound signal in a buffer with 32 frames, the sound signal processing unit 431 in an embodiment is supplied with a sound signal with 32 frames from the accumulation unit 43.

Hence, (32 frames/32 frames)×1.33 ms=1.33 ms, so that it is possible to consider that a delay time at a time when ICC is executed is reduced by 1.33 ms according to the present embodiment.

It is possible for a person(s) skilled in the art to readily derive an additional effect(s) and/or variation(s). Hence, a broader aspect(s) of the present invention is/are not limited to a specific detail(s) and a representative embodiment(s) as illustrated and described above. Therefore, various modifications are possible without departing from the spirit or scope of a general inventive concept that is defined by the appended claim(s) and an equivalent(s) thereof.

REFERENCE SIGNS LIST

1, 1a sound signal processing device
10 microphone
20 DSP
30 driver
41, 42, 43, 80 accumulation unit
81, 82, 83, 84, 411, 421, 422, 431 sound signal processing unit

The invention claimed is:

1. A sound signal processing device, comprising:
   a plurality of sound signal processing units where each of the plurality of sound signal processing units belongs to a respective group of a plurality of groups and executes a predetermined process by using a supplied sound signal; and
   a plurality of buffers that are provided with mutually different buffer sizes where each of the plurality of buffers is associated with one of the groups and supplies an accumulated sound signal to a respective sound signal processing unit of the plurality of sound signal processing units that belongs to an associated group of the plurality of groups, wherein
   two or more sound signal processing units of the plurality of sound signal processing units belong to a first group of the plurality of groups, and
   a first buffer of the plurality of buffers that is associated with the first group supplies the accumulated sound signal to the two or more sound signal processing units.

2. The sound signal processing device according to claim 1, wherein
   each sound signal processing unit belongs to the respective group according to a size of a sound signal that is needed for the predetermined process, and
   each buffer is provided with the buffer size that is identical to the size of the sound signal that is needed for the predetermined process of the respective sound signal processing unit of the plurality of sound signal processing units that belongs to the associated group.

3. The sound signal processing device according to claim 1, wherein
   the two or more sound signal processing units execute mutually different predetermined processes by using the accumulated sound signal.

4. A sound signal processing method that is executed by a sound signal processing device that includes a plurality of sound signal processing units where each of the plurality of sound signal processing units belongs to a respective group of a plurality of groups and a plurality of buffers that are provided with mutually different buffer sizes where each of the plurality of buffers is associated with one of the groups, the method comprising:
   supplying, by each of the plurality of buffers, an accumulated sound signal to a respective sound signal processing unit of the plurality of sound signal processing units that belongs to an associated group; and
   executing, by each sound signal processing unit, a predetermined process by using a supplied sound signal, wherein
   two or more sound signal processing units of the plurality of sound signal processing units belong to a first group of the plurality of groups, and
   a first buffer of the plurality of buffers that is associated with the first group supplies the accumulated sound signal to the two or more sound signal processing units.

5. A sound signal processing device, comprising:
   a plurality of sound signal processing units that execute predetermined processes by using supplied sound signals; and
   a plurality of buffers that accumulate sound signals with mutually different sizes and supply accumulated sound signals to the plurality of sound signal processing units, wherein each of the plurality of sound signal processing units receives a respective accumulated sound signal from a respective buffer of the plurality of buffers that accumulates the sound signal with a size that is needed for the predetermined process of each of the plurality of sound signal processing units, and two or more sound signal processing units of the plurality of sound signal processing units that execute the predetermined process by using the sound signal with an identical size, receive the sound signal with the identical size from one of the plurality of buffers.

\* \* \* \* \*